Patented July 14, 1942

2,289,416

UNITED STATES PATENT OFFICE 2,289,416

CEREAL PROCESS

Morris S. Fine, Orange, N. J., and Willard L. Roberts, Battle Creek, Mich., assignors to General Foods Corporation, New York, N. Y., a corporation of Delaware No Drawing. Application December 6, 1939, Serial No. 307,886

4 Claims. (Cl. 99—83)

This invention relates to the preparation of cooked cereal products, especially those having a substantial content of starch digestion products, and is directed to an improved method of preparing such products, as well as to the product resulting therefrom.

Cereal products of this character as heretofore prepared have been of two general types; granular products prepared from cereal flour, and flaked or shredded products prepared from whole grain cereal, meaning by that term to refer to the physical unity of the cereal berry rather than to its composition. The customary procedure in preparing the granular products has been to mix malt and cereal flour, usually malted barley flour and wheat flour, with water to form a paste or dough which is baked, dried and ground. During baking the diastase of the malt acts on the starch of the wheat flour to convert a portion of it to dextrins and sugars. In the case of flaked and shredded products, on the other hand, the practice has been to add malt in the form of a liquor or syrup to the surface of the whole cereal grains, which have been slightly crushed or "bumped" so as to break the bran coat but not destroy their unitary nature, and then to cook the same. Under these conditions no substantial conversion of the starch of the cereal grains is effected by the enzymes in the malt liquor or by the naturally occurring enzymes in the whole grain. As a result the proportion of dextrin and sugar and the level of malt flavor are dependent on the amount of malt liquor which can be taken up by the grains and still give a product that can be conveniently processed. Since this amount is limited, such flaked and shredded products have possessed a lower proportion of dextrins and sugars and level of malt flavor than the granular products and than has been considered desirable.

One of the objects of the present invention is to provide a process for preparing a cooked cereal product in other than granular form having a proportion of starch conversion products and a level of malt flavor comparable to that of granular products.

Another object is to provide a process whereby products made from whole grain cereal may be made richer in dextrins and sugars than is possible by the mere addition of malt syrup or other malt flavoring materials.

A further object is to provide a cooked product made from whole grain cereal in which the greater part of the starch of the cereal has been converted into dextrins and maltose.

Still another object is to provide a flaked product prepared from whole grain wheat which is low in starch but rich in dextrins and sugars and of a pleasing malt flavor.

Another object is to provide a process for preparing a cooked cereal product from whole grain wherein the major portion of the starch of the grain is converted by diastatic action and a readily digestible malt flavored product of desirable sweetness is obtained.

Broadly stated, the present invention involves the preparation of a cooked cereal product from whole grain in such a manner as to cause conversion of the starch of the cereal in situ, or directly within the grain itself to the extent required to provide the desired proportion of dextrins and sugars in the finished product. Such conversion of the starch of the whole grain used as the starting material may be brought about in a simple and inexpensive manner by the direct addition of starch splitting enzymes to the grain after suitable pretreatment thereof. Any suitable malted grain, as for instance malted wheat or malted barley, may be used as the source of the added enzyme or if desired use may be made of more concentrated forms of enzyme. It is well known that enzymic action increases rapidly as the temperature approaches the lethal point which depending on the period of heat treatment may vary from about 65° C. to 75° C., and it also is well known that such starch splitting enzymes act only slowly on raw starch but very rapidly on starch which has been gelatinized. A very efficient conversion of gelatinized starch hence may be obtained at temperatures in the range of 60–70° C.

When whole grain cereal such as wheat is "bumped" between steel rolls or otherwise partially flattened to about one-third its normal diameter, the outer bran coat is ruptured and the permeability of the endo-sperm is greatly increased without destroying the unity of the kernel. The starch of the wheat may be gelatinized by cooking with water before bumping, or such gelatinization can be readily obtained by subjecting the bumped grains to heat in the presence of moisture for a suitable period. We have discovered that when so treated the wheat can be acted on by starch splitting enzymes to convert the greater part of the starch in the individual kernels to dextrins and maltose without materially altering the contour of the bumped grains. Depending on which form is more convenient, the enzyme addition may be accomplished either by thoroughly wetting the gelatinized wheat with a solution of a starch splitting enzyme preparation of suitable strength or by mixing it with a slurry of malted barley or other suitable malted cereal flour and water, and thereafter holding the mixture at a suitable temperature for a sufficient time to secure the desired conversion. In practice, we have found a period of two hours at 60-70° C. to give excellent results, although for many purposes a shorter or longer period may be preferable. Similarly, the temperature at which the grain is held may be varied to suit particular conditions, for we have observed that changes in the proportionate amounts of dextrins and sugars formed, as well as in the characteristics of the finished product, can be brought about by changes in the temperature. When the period of digestion is completed, the converted grain is preferably subjected to heat to stop further enzymic action, after which it may be dried, tempered and processed in accordance with well-known methods to produce a toasted product in flaked, shredded or other desired form.

The following typical examples will serve to illustrate the various aspects of the invention as applied to the preparation of a flaked wheat product.

Example 1

Three pounds of water were added to 24 pounds of bumped wheat and the mixture cooked for 30 minutes at 15 pounds pressure to gelatinize the starch. After cooling to 70° C., 150 grams of salt and 3.5 pounds of malted barley flour were added, followed by five pounds of water at 67° C. The mixture was held for two hours, in the course of which the temperature dropped to 60° C., and at the end of this period it was cooked for 30 minutes at 15 pounds pressure. The converted product was then dried, tempered, flaked and toasted.

Example 2

Five pounds of water were added to 24 pounds of bumped wheat and the mixture cooked for 30 minutes at 15 pounds pressure. After cooling to 70° C., there was added to the wheat a diastatic mixture separately prepared by mixing three pounds of malted barley flour with 3½ pounds of water and holding the same for four hours at 60° C., followed by addition of ¼ pound of diastatic malt extract (435° L.) and 150 grams of salt, and the entire mass was held for one hour at 62-65° C. At the end of the digestion period, the mixture was cooked for 30 minutes at 15 pounds pressure and then dried, tempered, rolled into flakes and toasted in accordance with commercial practice.

Example 3

Four pounds of water were added to 24 pounds of bumped wheat and the mixture cooked for 30 minutes at 15 pounds pressure to gelatinize the starch. After cooling to 70° C., the wheat was mixed with ¾ pound of diastatic malt extract (435° L.) in two pounds of water at 55° C. and the mass held at about 65° C. for two hours. At the expiration of the conversion period, the mixture was cooked for 30 minutes at 15 pounds pressure and then dried, tempered, rolled and toasted as in Examples 1 and 2.

Example 4

Four pounds of water were added to 24 pounds of bumped wheat and the mixture cooked for 30 minutes at 15 pounds pressure. After cooling to 70° C., there was added to the wheat a diastatic mixture separately prepared by mixing 2½ pounds malted barley flour and 1 pound wheat flour with 4 pounds of water and holding the same for four hours at 60° C., followed by the addition of 150 grams of salt, and the entire mass was held for two hours at 62-65° C. At the end of the digestion period, the mixture was cooked for 30 minutes at 15 pounds pressure and then dried, tempered, rolled into flakes and toasted in accordance with commercial practice.

Example 5

Twenty-four pounds of bumped wheat and four pounds of water were cooked for 1 hour at 15 pounds pressure. After cooling to 70° C., 2 pounds of a water solution containing 140 g. of salt and 5 g. of a Röhm and Haas diastase concentrate (an *Aspergillus oryzae* amylase preparation) was added to the cooled-gelatinized wheat and the mixture was held for several hours at 62-65° C. At the end of this time the mixture was cooked for ½ hour at 15 pounds pressure and then dried, tempered, flaked, and toasted.

Analyses of the products prepared in accordance with the procedures of the foregoing examples show values of 16-20% dextrins and 18-22% sugars, or ratios of dextrins and sugars to starch of 1.3 to 1.5, as compared with 11-12% dextrins and 4-10% sugars, or ratios of dextrins and sugars to starch of .3 to .5, for customary flaked and shredded products, and 23% dextrins and 15% sugars, or a dextrin and sugar to starch ratio of 1.0 for a representative granular product. It accordingly will be evident from the modifications of the invention illustrated in the examples, that in situ conversions of the starch of whole grain cereal may be effected in various ways and to a greater or lesser extent depending on the proportions of dextrins and sugars desired in the final product. It also will be understood that while the examples relate to the preparation of a flaked wheat product, the invention is equally applicable to the preparation of shredded products. Moreover other whole grain cereals may be used, if desired, and suitable modifications in the amount and kind of ingredients, as well as in the time and temperature of treatment and the form of the finished product, may be made without departing from the spirit and scope of the invention as defined by the appended claims.

What is claimed is:

1. A process of preparing a cereal product from whole grain which comprises rupturing the bran coat of the kernels, gelatinizing the starch therein, subjecting the gelatinized starch within the individual kernels to the action of added starch splitting enzyme to convert the greater part thereof to dextrins and sugars, cooking the treated grain to inactivate the enzyme, shaping the cooked grain to the desired physical form, and toasting the shaped grain.

2. A process of preparing a cereal product from whole grain which comprises rupturing the bran coat of the kernels, gelatinizing the starch therein, mixing the gelatinized grain with a preparation containing starch splitting enzyme and water, subjecting the mixture to a temperature below the lethal temperature of the enzyme for a period sufficient to effect conversion of the greater part of the starch within the individual kernels to dextrins and sugars, cooking the treated grain to inactivate the enzyme, shaping the cooked grain to the desired physical form, and toasting the shaped grain.

3. A process of preparing a cereal product from whole grain wheat which comprises rupturing the bran coat of the kernels, heating the grain in the presence of added moisture to gelatinize the starch therein, mixing the gelatinized grain with enzyme-containing malted barley flour and water, holding the mixture at a temperature not exceeding 70° C. for a period sufficient to effect conversion of the greater part of the starch within the individual kernels to dextrins and sugars, cooking the treated grain to inactivate the enzyme, shaping the cooked grain to the desired physical forms, and toasting the shaped grain.

4. A process of preparing from whole grain wheat a cereal product having a ratio of dextrins and sugars to starch of at least 1.3 which comprises rupturing the bran coat of the kernels, gelatinizing the starch therein by treatment with heat and added moisture, subjecting the treated wheat to the action of a diastatic enzyme to convert part of the gelatinized starch within the individual kernels to dextrins and sugars in the ratio of at least 1.3 to the remaining starch, cooking the wheat to inactivate the enzyme, shaping the cooked wheat to the desired physical form, and toasting the shaped wheat.

MORRIS S. FINE.
WILLARD L. ROBERTS.